United States Patent [19]

Armstrong

[11] Patent Number: 4,724,022
[45] Date of Patent: Feb. 9, 1988

[54] METHOD OF PREPARING A GLASS RELEASE SURFACE EMPLOYING A PERFLUOROSILANE FOR MANUFACTURING AN ANTI-LACERATIVE WINDOW ASSEMBLY

[75] Inventor: George H. Armstrong, Holland, Ohio

[73] Assignee: Libbey-Owens-Ford Co., Toledo, Ohio

[21] Appl. No.: 833,806

[22] Filed: Feb. 28, 1986

[51] Int. Cl.$^4$ .............................................. B32B 17/00
[52] U.S. Cl. ................................. 156/99; 106/287.13; 106/287.16; 156/102; 156/104; 156/289; 156/323; 428/425.5; 428/425.6; 556/488
[58] Field of Search ................ 156/99, 104, 102, 323, 156/289; 106/287.13, 287.16; 428/425.5, 425.6; 556/482, 488

[56] References Cited

U.S. PATENT DOCUMENTS 3,427,336  2/1969  Tiers .................................... 556/488
3,808,077  4/1974  Rieser et al. ........................ 156/289

Primary Examiner—John J. Gallagher
Attorney, Agent, or Firm—Marshall & Melhorn

[57] ABSTRACT

An improved method of preparing a glass release surface useful in the manufacture of anti-lacerative window assemblies is disclosed. The glass surface is treated with a perfluorosilane such as (Heptadecafluoro-1,1,2,2-Tetrahydrodecyl)-1-Trichlorosilane, and thereafter may be easily released from the polyurethane layer of an anti-lacerative window assembly. The release agent (Heptadecafluoro-1,1,2,2-Tetrahydrodecyl)-1-Trichlorosilane is particularly useful under severe laminating conditions such as high temperature and pressure over a long period of time. Its use imparts excellent optical properties to the polyurethane layer.

8 Claims, No Drawings

METHOD OF PREPARING A GLASS RELEASE SURFACE EMPLOYING A PERFLUOROSILANE FOR MANUFACTURING AN ANTI-LACERATIVE WINDOW ASSEMBLY

FIELD OF THE INVENTION

This invention relates generally to the field of treating glass to produce a release surface for releasing thermoplastic polyurethanes; and more particularly to the treatment of a glass cover plate for releasing a thermoplastic polyurethane surface, useful in the manufacture of anti-lacerative window, e.g., automotive windshield, assemblies.

BACKGROUND OF THE INVENTION

The art of laminating layers of glass and interposed polymeric materials to produce "safety glass" laminates has been practiced for many years by the manufacturers of automobile windshields. Such composites effectively reduced the serious injuries that had previously resulted from bodily ejection from an automobile through a shattered single pane windshield upon impact during an accident. However, the glass and polymer, i.e., polyvinyl butyral, composites still were likely to cause severe lacerations and cosmetic disfigurement due to flying pieces of broken glass or bodily contact with the windshield.

Thereafter, anti-lacerative windshields were developed, having one or more layers of glass substrate and a layer of polymeric material bonded to the inside surface of the windshield facing the passenger compartment. This configuration provided a substantial improvement in safety by placing a shock absorbent layer of material between the glass windshield and the automobile passengers. It eliminated the likelihood of flying glass particles within the passenger compartment upon impact during an accident, and provided a body impact surface that aided the deceleration of a person thrust against the windshield, thereby reducing his or her susceptibility to lacerations. In addition, it reduced laceration by avoiding direct body contact with broken glass.

Although several methods exist for the bonding of a polymeric material to the inner surface of an automobile windshield, the art has not developed into an industry-wide standard because of the problems encountered in producing an optically transparent laminate. More specifically, manufacturers have found it difficult to form the exposed surface of the polymeric material so that it is at all points parallel to the surface of the glass substrate, and optically clear.

One method of manufacture involves the use of a glass cover plate which substantially conforms to the predetermined curvature of a glass windshield substrate. The cover plate is contacted to the surface of a film of thermoplastic polyurethane, which in turn is intimately contacted to a glass windshield substrate. Pressure is applied to the cover plate in order to laminate the thermoplastic polyurethane film to the glass windshield substrate, and to impress a smooth, optically transparent surface onto the surface of the polyurethane layer. Such an operation requires a release agent which allows the cover plate to easily and cleanly part from the polyurethane layer, following a laminating process employing severe conditions of high temperature and pressure over a long period of time, without affecting the smooth image impressed by the cover plate onto the polyurethane layer.

SUMMARY OF THE INVENTION

The present invention provides a solution to the aforementioned problem. I have discovered that a perfluorosilane, including a preferred (Heptadecafluoro-1,1,2,2-Tetrahydrodecyl)-1-Trichlorosilane is a superior parting agent, the perfluorosilane being effective under severe laminating conditions of high temperature and pressure over a long period of time, for glass in intimate contact with thermoplastic polyurethanes. Additionally, the perfluorosilane of the present invention is functional as a parting agent between glass and thermoset polyurethanes. Dodecyltriethoxysilane and octadecyltriethoxysilane have been found to be ineffective as parting agents under severe laminating conditions as sometimes encountered in the manufacture of windshields, e.g., 250° F. to 325° F., 215 psig to 275 psig, for periods of 25 to 55 minutes.

Glass treated with (Heptadecafluoro-1,1,2,2-Tetrahydrodecyl)-1-Trichlorosilane effectively releases thermoplastic polyurethane when employed in press laminating processes using high temperatures, for example 285 degrees F., and high pressures, for example 225 psig, for long periods of time, for example 45 minutes. The (Heptadecafluoro-1,1,2,2-Tetrahydrodecyl)-1-Trichlorosilane is directly applied to the surface of the glass plate, which then contacts the polyurethane. This intersection defines the release surface along which the glass plate and polyurethane material may be parted.

DETAILED DESCRIPTION OF THE PREFERRED EMBODIMENT

Release agents are essential in the manufacture of anti-lacerative windshields which require that an optically clear finish be formed on the surface of the thermoplastic polyurethane layer facing the passenger compartment of an automobile. A thermoplastic polyurethane film is typically laminated to a glass windshield substrate by applying pressure to the polyurethane film which, by means of a preapplied primer, bonds to the glass windshield substrate. The pressure directed toward the surface of the thermoplastic polyurethane film is generally effectuated through a glass cover plate which substantially conforms to the predetermined curvature of the glass windshield substrate. A release agent must be interposed between the cover plate and thermoplastic polyurethane film in order for a clean separation to occur after the laminating process. Determining the proper release agent is particularly difficult when the laminating process is carried out under severe conditions such as high temperature and pressure over a long period of time. The release agent must be easy to apply under commercial manufacturing conditions, have no detrimental effect on the physical or chemical properties of the polyurethane layer, and accurately reproduce the smooth surface finish of the glass cover plate.

According to the present invention, a superior release surface results from the application of a perfluorosilane, preferably (Heptadecafluoro-1,1,2,2-Tetrahydrodecyl)-1-Trichlorosilane, to glass, which is thereafter intimately contacted to the thermoplastic polyurethane. The glass is treated by wiping the (Heptadecafluoro-1,1,2,2-Tetrahydrodecyl)-1-Trichlorosilane onto the surface in one or more applications, followed by drying at room temperature or with the aid of a convection oven.

The use of the perfluorosilane such as (Heptadecafluoro-1,1,2,2-Tetrahydrodecyl)-1-Trichlorosilane has several advantages over existing release agents. It is simply applied by wiping onto a glass cover plate in smooth strokes. This suggests minimal expenditures for the manufacturing equipment necessary for large scale production of anti-lacerative windshields. The perfluorosilane release agent may be handled and cured at ambient temperatures, also implying reduced manufacturing costs. Finally, the use of perfluorosilane results in a thermoplastic polyurethane surface having optical properties superior to those produced by many existing release agents.

The present invention comprises a release agent preferably containing approximately 1.0 to 15 percent by weight of a perfluorosilane such as (Heptadecafluoro-1,1,2,2-Tetrahydrodecyl)-1-Trichlorosilane in a suitable solvent. Alcohols are desirable solvents, and more particularly isopropanol is preferred.

A glass cover plate, utilized for applying pressure to the thermoplastic polyurethane surface in a polyurethane-and-glass prelaminate anti-lacerative windshield assemblage, the surface features of which will be reproduced on the exposed surface of the thermoplastic polyurethane layer, is prepared. The solution of the perfluorosilane such as (Heptadecafluoro-1,1,2,2-Tetrahydrodecyl)-1-Trichlorosilane in an appropriate solvent is preferably applied to the glass cover plate by wetting an absorbent towel and wiping the solution onto the release surface of the cover plate in smooth longitudinal strokes, then buffed perpendicularly to the direction of application. However, other mechanical methods of application that produce a uniform coating may be employed. The cover plate is then preferably heated by placing it into a forced air convection oven for approximately fifteen minutes to two hours, at a temperature of approximately 50 to 120 degrees C., after which it is removed from the oven and allowed to cool to room temperature. It must be understood that the operation of heating the cover plate need not be performed in order to form the release surface; allowing the cover plate to stand at room temperature for a period of approximately fifteen minutes to four hours will likewise establish the release surface. Although it is preferable to make a single application of the (Heptadecafluoro-1,1,2,2-Tetrahydrodecyl)-1-Trichlorosilane solution, the aforementioned steps, including treating the glass surface and heating the cover plate, may be repeated.

The (Heptadecafluoro-1,1,2,2-Tetrahydrodecyl)-1-Trichlorosilane treated glass release surface of the present invention is useful for releasing the thermoplastic polyurethane layer of an anti-lacerative window. Parting of the glass cover plate and the polyurethane layer is achieved with minimal mechanical force and results in an optically transparent anti-lacerative window.

Those polyurethanes which are useful in the practice of the present invention are generally described as the reaction products of a polyisocyanate and a polyol, as for example disclosed in U.S. Pat. No. 3,900,686 to Ammons et al.

The preferred polyisocyanate is 4,4'-methylene-bis-(cyclohexyl isocyanate), which is commercially available from the E. I. du Pont de Nemours and Company under the trademark Hylene W. Other suitable aliphatic diisocyanates include, but are not limited to, 4,4'-isopropylidene-bis-(cyclohexyl isocyanate), 1,4-cyclohexyl diisocyanate, 1-4-tetramethylene diisocyanate, and 1,6-hexamethylene diisocyanate. Although not preferred, other polyisocyanates including hydrogenated aromatic diisocyanates, mixtures of cycloaliphatic and straight chained aliphatic diisocyanates and/or aromatic diisocyanates, and substituted diisocyanates, as well as thioisocyanates, may be used.

The polyisocyanates listed above are reacted with at least one polyol having at least two functional groups which are reactive with the isocyanate groups and chain extender diol such as butane diol. Typical polyols include polyester diols and polyether diols, preferably having a number average molecular weight of approximately 500 to 5000.

The preferred polyester diols utilized for producing polyurethanes in the present invention are represented by the reaction products of an aliphatic dicarboxylic acid having for example adipic, succinic, glutaric, palmitic or suberic functional components, with a suitable aliphatic diol such as ethylene glycol, 1,3-propanediol, 1,4-butanediol or 1,6-hexanediol. Polyester diols useful for the preparation of polyurethanes used in the present invention may additionally be formed by the reaction of caprolactone monomers, including gamma-carprolactone, delta-caprolactone, epsilon-caprolactone, monoalkyl or dialkyl caprolactone, with a suitable glycol such as ethylene glycol, diethylene glycol, triethylene glycol, 1,4-butanediol or 1,6 hexanediol.

The preferred polyether diols utilized for producing polyurethanes in the present invention include, but are not limited to polytetramethylene glycol ether, polytrimethylene glycol ether, polypentamethylene glycol ether and polyhexamethylene glycol ether.

The thermoplastic polyurethane film is positioned in intimate surface contact with the inboard surface of a glass windshield substrate, to which a primer has been applied for the bonding of the polyurethane film to the glass windshield substrate. The previously prepared glass cover plate, which has substantially the same predetermined curvature of the glass windshield substrate, is positioned with its treated surface in intimate surface contact with the exposed surface of the polyurethane film.

Conventional means for compressing and heating the assemblage, thereby urging the glass cover plate toward the glass windshield substrate, are employed. This causes the thermoplastic polyurethane film to bond to the glass windshield substrate. The release agent is particularly effective under the severe laminating conditions of high temperature, for example 285 degrees F., and high pressure, for example 225 psig, over a long period of time, for example 45 minutes.

Thereafter, the glass cover plate is parted from the polyurethane layer of the anti-lacerative windshield laminate along the boundary defined by the intersection between the polyurethane film and the glass cover plate the surface of which has been treated with the (Heptadecafluoro-1,1,2,2-Tetrahydrodecyl)-1-Trichlorosilanetriethoxysilane parting agent according to the present invention. The disclosure of a process for manufacturing and method of assembling anti-lacerative windshields is described in U.S. Pat. No. 3,808,077 to R. G. Rieser et al.

EXAMPLE 1

An anti-lacerative laminate was produced by first assembling into a stacked relationship an outboard glass sheet, a sheet of polyvinylbutyral and an inboard glass sheet. The inner surface of the inboard glass sheet (that is to say, the surface not facing the polyvinylbutyral sheet) was treated with a three percent by weight solution of gamma-aminopropyltriethoxysilane in isopropanol as a primer for adhesion of a thermoplastic polyurethane film. The solution was applied by wetting an absorbent towel and wiping the solution onto the surface in smooth strokes. The stacked assemblage was allowed to stand at room temperature for thirty minutes.

A clean glass cover plate, having substantially the same predetermined curvature and surface area as the stacked laminate assemblage, was treated with a three percent by weight solution of (Heptadecafluoro-1,1,2,2-Tetrahydrodecyl)-1-Trichlorosilane, referred to as perfluorosilane, in isopropanol. The solution was applied to the release surface of the cover plate by wetting an absorbent towel and wiping the solution onto the cover plate in smooth longitudinal strokes, then buffing the cover plate perpendicularly to the direction of application. The cover plate was heated by placing it in a forced air convection oven for one hour at 93 degrees C., then removed from the oven and allowed to cool to room temperature. Thus, the release surface was prepared for utilization.

A thermoplastic polyurethane film, produced by the reaction of 4,4'-methylene-bis-(cyclohexyl isocyanate) (HYLENE W) and an adipic acid polyester extended with 1,4-butanediol, was prepared for bonding to the inboard glass sheet. Suitable thermoplastic polyurethanes are commercially available from K. J. Quinn & Company, Inc. under the product code designation PN-03 and PE-192. The thermoplastic polyurethane film was positioned in intimate surface contact adjacent the treated surface of the inboard glass sheet, and the treated release surface of the cover plate was positioned in intimate surface contact adjacent the opposing surface of the polyurethane film.

A vacuum bag was sealed around the perimeter of the stacked, prelaminated assemblage. The assemblage was laminated under severe conditions by placing same in an oil autoclave for 45 minutes at 285 degrees F. and 225 psig pressure. The autoclave was cooled to room temperature, and the assembly removed. The vacuum bag was removed and the cover plate parted from the anti-lacerative laminate.

Many laminates were produced by this method, and each possessed excellent optical qualities.

EXAMPLE 2

The relative releasing ability of release agents can be demonstrated by observing the contact angle of a drop of water on a surface formed by application of the release agent to glass.* It has been found that to be acceptable for coating a glass cover plate to be employed in bonding polyurethane to glass and use of the resulting structure in automotive vision areas the contact angle should be at least 85°, and preferably 90°. Excellent results are obtained when utilizing a release agent for the manufacture of windshields under severe laminating conditions if the contact angle is at least 93° to 95°:

| Contact Angle for Release Agents | | |
| --- | --- | --- |
| Release Agent | Carbon Chain Length | Contact Angle Degrees |
| Perfluorosilane | C10 | 93 |
| Octadecyltriethoxysilane | C18 | 79 |

-continued

| Contact Angle for Release Agents | | |
| --- | --- | --- |
| Release Agent | Carbon Chain Length | Contact Angle Degrees |
| Dodecyltriethoxysilane | C12 | 55 |
| None | — | 28 |

*A detailed discussion of this subject can be found in an article by W. A. Zisman, "Influence of Constitution on Adhesion," *Industrial and Engineering Chemistry*, Vol. 55, No. 10, October 1963.

These examples serve to illustrate the present invention; however, it must be understood that the present invention may be practiced otherwise than as specifically described without departing from the scope of the following claims.

I claim:

1. A method of providing an optically transparent, anti-lacerative windshield assembly for a motor vehicle, the method comprising the steps of:
   (a) assembling into a stacked relationship individual layers including a transparent glass substrate sheet having a predetermined curvature, a thermoplastic polyurethane anti-laceration film abutting one surface of the glass substrate sheet, a glass cover plate having substantially the same curvature as the glass substrate sheet and abutting the polyurethane film on its side opposite the glass substrate sheet;
   (b) coating the glass cover plate with (Heptadecafluoro-1,1,2,2-Tetrahydrodecyl)-1-Trichlorosilane on its side adjacent the polyurethane film, prior to assembly with the glass substrate sheet and polyurethane film;
   (c) compressing the stacked assemblage; and
   (d) releasing the glass cover plate from the polyurethane layer without marring the surface of the polyurethane layer, to provide an optically transparent, anti-lacerative windshield assembly.

2. A method as defined in claim 1, in which a solution of approximately 1 to 15 weight percent of (Heptadecafluoro-1,1,2,2-Tetrahydrodecyl)-1-Trichlorosilane in a solvent is coated onto the glass cover plate, and the coating dried prior to compression of the assemblage.

3. A method as defined in claim 1, in which the stacked assemblage is compressed by evacuating air from between the layers of the assemblage and placing the assemblage in an autoclave for from 25 to 55 minutes at a temperature between 250° F. to 325° F. and a pressure between 215 psig to 275 psig.

4. In a method of producing an optically transparent anti-lacerative window assembly comprising:
   (a) assembling into a stacked relationship individual layers including a transparent glass substrate sheet having a predetermined curvature, a thermoplastic polyurethane anti-laceration film abutting one surface of the glass substrate sheet, and a glass cover plate having substantially the same curvature as the glass substrate sheet and abutting the polyurethane film; and
   (b) compressing the stacked assemblage by evacuating air from between the layers of the assemblage and thereafter placing the assemblage in an autoclave, the glass cover plate providing optical properties to the polyurethane layer; the improvement comprising applying a solution of approximately 1 to 15 weight percent of (Heptadecafluoro-1,1,2,2-Tetrahydrodecyl)-1-Trichlorosilane in a solvent to the surface of the cover plate abutting the polyurethane film and thereafter drying same before compressing the stacked assemblage to prevent adherence of the cover plate to the polyurethane layer, and operating the autoclave with the assemblage therein for from 25 to 55 minutes at a temperature between 250° F. and 325° F. and a pressure between 215 psig to 275 psig thereby producing an optically transparent window assembly in which the polyurethane layer has good optical properties and good anti-lacerative properties.

5. A method as defined in either of claims 4 or 1, in which a solution of about 3 percent by weight of (Heptadecafluoro-1,1,2,2-Tetrahydrodecyl)-1-Trichlorosilane is used to coat the glass cover plate.

6. A method as defined in either of claims 4 or 1, in which the polyurethane is a polyester polyurethane.

7. A method as defined in either of claims 4 or 1, in which the polyurethane is a polyether polyurethane.

8. A method as defined in either of claims 1 or 2, in which the stacked assemblage is compressed by evacuating air from between the layers of the assemblage and placing the assemblage in an autoclave for 45 minutes at 285° F. under 225 psig pressure.

* * * * *